United States Patent
Wang et al.

(10) Patent No.: US 10,831,091 B2
(45) Date of Patent: Nov. 10, 2020

(54) PROJECTION DEVICE AND ILLUMINATION SYSTEM

(71) Applicant: Coretronic Corporation, Hsin-Chu (TW)

(72) Inventors: Chun-Ju Wang, Hsin-Chu (TW); Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/383,681

(22) Filed: Apr. 15, 2019

(65) Prior Publication Data

US 2019/0317392 A1     Oct. 17, 2019

(30) Foreign Application Priority Data

Apr. 17, 2018   (CN) .......................... 2018 2 0542715

(51) Int. Cl.
   *G03B 21/20*   (2006.01)

(52) U.S. Cl.
   CPC ....... *G03B 21/2066* (2013.01); *G03B 21/204* (2013.01); *G03B 21/208* (2013.01)

(58) Field of Classification Search
   CPC .............. G03B 21/2066; G03B 21/204; G03B 21/208; G03B 21/20; G03B 21/2033; G03B 21/2013; F21V 5/007; F21V 5/008
   See application file for complete search history.

(56) References Cited

U.S. PATENT DOCUMENTS

| | | | | |
|---|---|---|---|---|
| 9,348,206 B2* | 5/2016 | Matsubara | ......... | G03B 21/2073 |
| 2006/0238720 A1* | 10/2006 | Lee | .................... | G03B 21/2033 |
| | | | | 353/38 |
| 2011/0096299 A1 | 4/2011 | Huang et al. | | |
| 2012/0008098 A1* | 1/2012 | Akiyama | ............. | G03B 21/204 |
| | | | | 353/30 |

FOREIGN PATENT DOCUMENTS

CN        202629628 U      12/2012

* cited by examiner

*Primary Examiner* — Bao Q Truong

(57) ABSTRACT

An illumination system and a projection device using this illumination system are provided. The illumination system is adapted to provide an illumination light beam. The illumination system includes a plurality of light emitting element package structures and a light condensing element. The light emitting element package structures are adapted to provide a plurality of excitation light beams, respectively. The light condensing element is disposed on transmission paths of the excitation light beams. Each of the light emitting element package structures includes a substrate, a plurality of light emitting chips, and a package lens. The light emitting chips are disposed on the substrate. The package lens is disposed on the substrate and covers the light emitting chips. Each of the package lenses includes a plurality of lens units, and the lens units in each of the package lenses are integrally connected to cover the light emitting chips.

11 Claims, 8 Drawing Sheets

PROJECTION DEVICE AND ILLUMINATION SYSTEM

CROSS-REFERENCE TO RELATED APPLICATION

This application claims the priority benefit of China application (CN201820542715.3), filed on 2018 Apr. 17. The entirety of the above-mentioned patent application is hereby incorporated by reference herein and made a part of this specification.

FIELD OF THE INVENTION

The invention relates to a display device, and more particularly to an illumination system and a projection device using the same.

BACKGROUND OF THE INVENTION

The type of light source used in projection devices has evolved from ultra high pressure mercury lamps (UHP lamps), light emitting diodes (LEDs) to laser diodes (LDs) with the market demand for projection device brightness, color saturation, service life, non-toxic environmental protection, etc.

In a conventional projection device using a laser diode, each of the laser diode modules includes a plurality of laser diodes and a carrier for fixing the laser diodes, wherein each of the laser diodes is a separate package, and one package has only one laser emitting chip. Due to such an architecture, the separation distance between the laser diodes in the laser diode module is large, resulting in a large size of the entire laser diode module, thereby enlarging the size of the entire projection device. In addition, due to the large size of the laser diode module, when the projection device needs to use a plurality of the above-mentioned laser diode modules to reach higher brightness, a larger lens is needed to merge the light, resulting in the size of the projection device will in turn become larger.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a projection device having the advantage of compacted size.

The invention provides an illumination system having the advantage of compacted size.

Other advantages and objects of the invention may be further illustrated by the technical features broadly embodied and described as follows.

In order to achieve one or a portion of or all of the objects or other objects, a projection device provided in an embodiment of the invention includes an illumination system, a light valve, and a projection lens. The illumination system is adapted to provide an illumination light beam. The illumination system includes a plurality of light emitting element package structures and a light condensing element. The light emitting element package structures are adapted to provide a plurality of excitation light beams, respectively, and the light condensing element is disposed on the transmission paths of the excitation light beams. Each of the light emitting element package structures includes a substrate, a plurality of light emitting chips, and a package lens. The light emitting chips are disposed on the substrate. The package lens is disposed on the substrate and covers the light emitting chips. Each of the package lenses includes a plurality of lens units, and the lens units in each of the package lenses are integrally connected to cover the light emitting chips. The light valve is disposed on the transmission path of the illumination light beam and is adapted to convert the illumination light beam into an image light beam. The projection lens is disposed on the transmission path of the image light beam and is adapted to pass the image light beam.

In order to achieve one or a portion of or all of the objects or other objects, an illumination system provided in an embodiment of the invention is adapted to provide an illumination light beam. The illumination system includes a plurality of light emitting element package structures and a light condensing element. The light emitting element package structures are adapted to provide a plurality of excitation light beams, respectively, and the light condensing element is disposed on the transmission paths of the excitation light beams. Each of the light emitting element package structures includes a substrate, a plurality of light emitting chips, and a package lens. The light emitting chips are disposed on the substrate. The package lens is disposed on the substrate and covers the light emitting chips. Each of the package lenses includes a plurality of lens units, and the lens units in each of the package lenses are integrally connected to cover the light emitting chips.

Different from the prior art, the light emitting element package structure used in the illumination system of the embodiment of the invention can arrange the plurality of light emitting chips in the same light emitting element package structure, so that the arrangement between the light emitting chips can be closer. Compared with the prior art, in the case where the number of the light emitting chips is the same, the light emitting element package structure of the embodiment of the invention has compacted size, and the size of the light condensing element can be compacted due to the tight arrangement between the light emitting chips, so the size of the illumination system can be compacted, and the size and cost of the light condensing element can be reduced too. The projection device of the embodiment of the invention has the advantage of compacted size due to the use of the illumination system described above.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
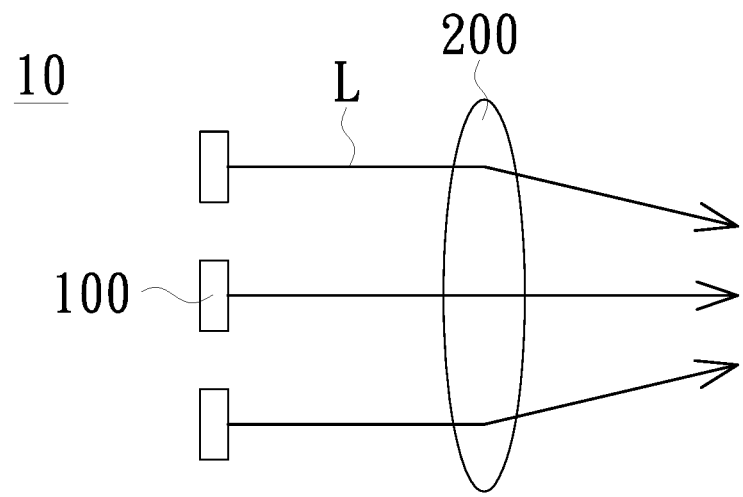
FIG. 1A is a schematic diagram of an illumination system of one embodiment of the invention.
Figure 1B:
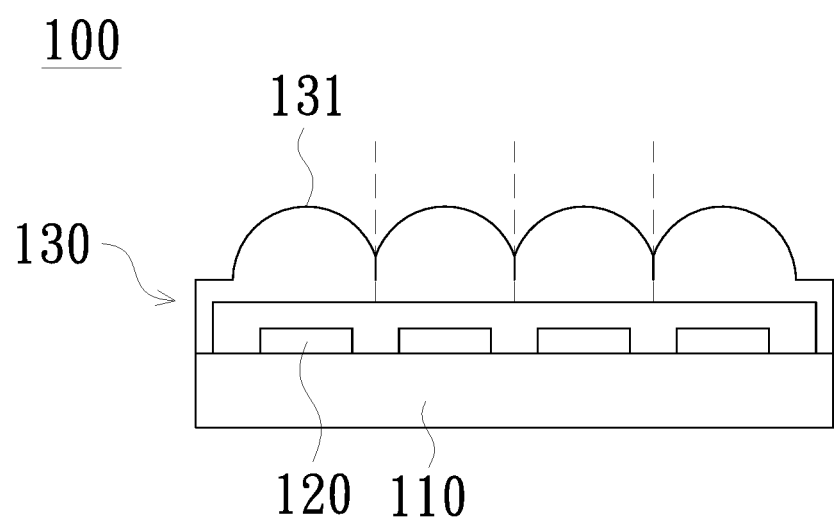
FIG. 1B is a schematic cross-sectional view of a light emitting element package structure of one embodiment of the invention.
Figure 1C:
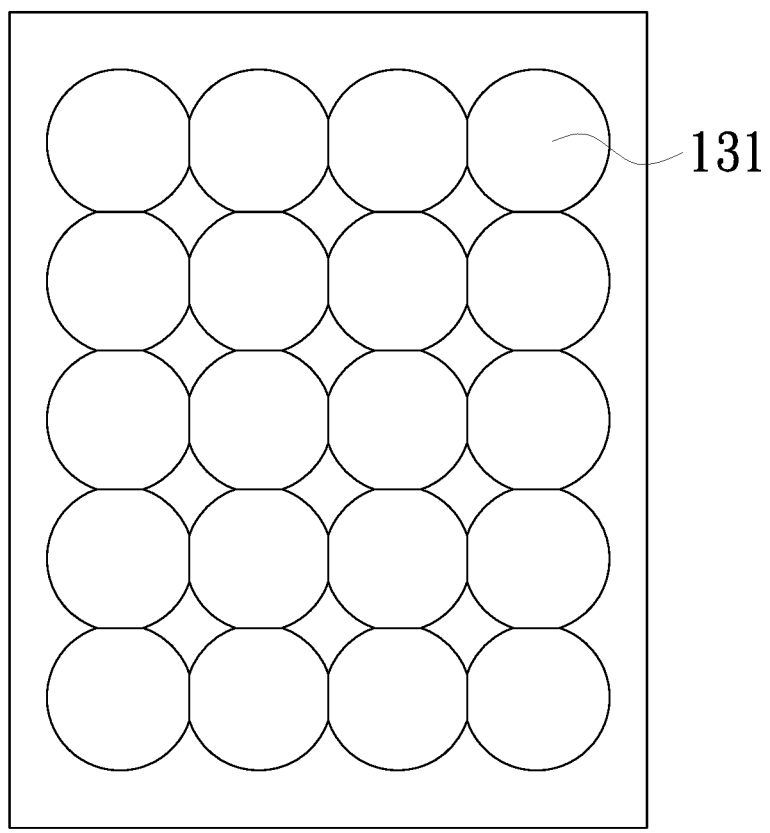
FIG. 1C is a top view of a package lens of one embodiment of the invention.

FIG. 1A is a schematic diagram of an illumination system of one embodiment of the invention. FIG. 1B is a schematic cross-sectional view of a light emitting element package structure of one embodiment of the invention. FIG. 1C is a top view of a package lens of one embodiment of the invention. Firstly, referring to FIG. 1A, the illumination system 10 of the embodiment includes a plurality of light emitting element package structures 100 and a light condensing element 200. FIG. 1A shows an example of three light emitting element package structures 100, but is not limited thereto. The light emitting element package structures 100 are adapted to provide a plurality of excitation light beams L, respectively. The light condensing element 200 is disposed on the transmission paths of the excitation light beams L. The light condensing element 200 is, for example, a light condensing lens, but is not limited thereto. In the embodiment, all the light emitting element package structures 100 are, for example, relatively disposed to the light condensing element 200, that is, the light emitting element package structures 100, for example, all correspond to the light condensing element 200, and the excitation light beams L are transmitted to the light condensing element 200, for example, without being deflected.

Referring to FIG. 1B and FIG. 1C, the light emitting element package structure 100 includes a substrate 110, a plurality of light emitting chips 120, and a package lens 130. The light emitting chips 120 are disposed on the substrate 110. The substrate 110 is, for example, a circuit board, and can be used to drive the light emitting chips 120 to emit light. Each of the light emitting chips 120 is, for example, a laser diode chip, but is not limited thereto, and may also be, for example, a light emitting diode chip. The plurality of light emitting chips 120 may be arranged in an array on the substrate 110. The package lens 130 is disposed on the substrate 110 and covers the light emitting chips 120. In other embodiments, the light emitting element package structure 100 may further include a cover glass disposed between the substrate 110 and the package lens 130 and covering the light emitting chips 120, but is not limited thereto. The package lens 130 includes a plurality of lens units 131, and the lens units 131 in the package lens 130 are integrally connected to cover the light emitting chips 120. In the embodiment, each lens unit 131 corresponds to and covers one of the light emitting chips 120. The numbers of the light emitting chips 120 and the lens units 131 in the embodiment both are 20 as an example (for example, both being in 4×5 arrays), but the numbers and arrangement of the light emitting chips 120 and the lens units 131 are not limited in the invention. For example, in other embodiments, the lens units 131 are, for example, arranged in an array of 4×5, that is, the number of the lens units 131 is, for example, 20, and the number of the light-emitting chips 120 is, for example, less than 20, and each of the light emitting chips 120 is covered by one lens unit 131; that is, each of the light emitting chips 120 corresponds to one lens unit 131, and each of the lens units 131 does not necessarily correspond to the light emitting chip 120. According to the above, the number of the light emitting chips 120 can be equal to or smaller than the number of the lens units 131.

The lens unit 131 described above has, for example, a positive refractive power, but is not limited thereto. The invention does not limit the specific shape of each lens unit 131. In one embodiment, each lens unit 131 is, for example, a collimating lens, but is not limited thereto.

In the embodiment, since the plurality of light emitting chips 120 are disposed in the same light emitting element package structure 100 and covered by the same lens unit 131, the arrangement between the light emitting chips 120 can be closer. Compared with the prior art, in the case where the number of the light emitting chips 120 is the same, the light emitting element package structure 100 of the embodiment of the invention has compacted size, and the size of the light condensing element 200 can be compacted due to the tight arrangement between the light emitting chips 120, so the size of the illumination system 10 can be compacted. Further, in the embodiment, the shape of each lens unit 131 is, for example, an atypical hemisphere. In the atypical hemispheres, the places where the lens units 131 are connected to each other are similar to planes after being cut, that is, similar to the dotted lines in FIG. 1B. In this manner, the arrangement of the plurality of light emitting chips 120 corresponding to the plurality of lens units 131 can be closer to further reduce the size of the light emitting element package structure 100, thereby improving the utilization of the internal space of the light machine.

FIG. 2A to FIG. 2D are schematic diagrams of spots formed by excitation light beams on a light condensing element in the illumination system of four embodiments of the invention. Referring to FIG. 1A, and FIG. 2A to FIG. 2D, in the embodiments, the number of the light emitting element package structures 100 is exemplified by three, but the invention is not limited thereto. In detail, the number of the light emitting element package structures 100 is, for example, N, and N is selected from 3, 4, 5, or 6, but not limited thereto. N may also be 2 or more than 6. The excitation light beam provided by each of the light emitting element package structures 100 forms a spot S on the light condensing element 200. The centers C1 of the spots S are respectively connected to the center C2 of the light condensing element 200 into a plurality of straight lines A (shown by dotted lines in FIG. 2A to FIG. 2D). The angles θ between the straight lines A are, for example, 360°/N. For example, the excitation light beams provided by the three light emitting element package structures in FIG. 2A form three spots S on the light condensing element 200, and the angles θ are 120°. The excitation light beams provided by the four light emitting element package structures in FIG. 2B form four spots S on the light condensing element 200, and the angles θ are 90°. The excitation light beams provided by the five light emitting element package structures in FIG. 2C form five spots S on the light condensing element 200, and the angles θ are 72°. The excitation light beams provided by the six light emitting element package structures in FIG. 2D form six spots S on the light condensing element 200, and the angles θ are 60°.

Figure 2A:
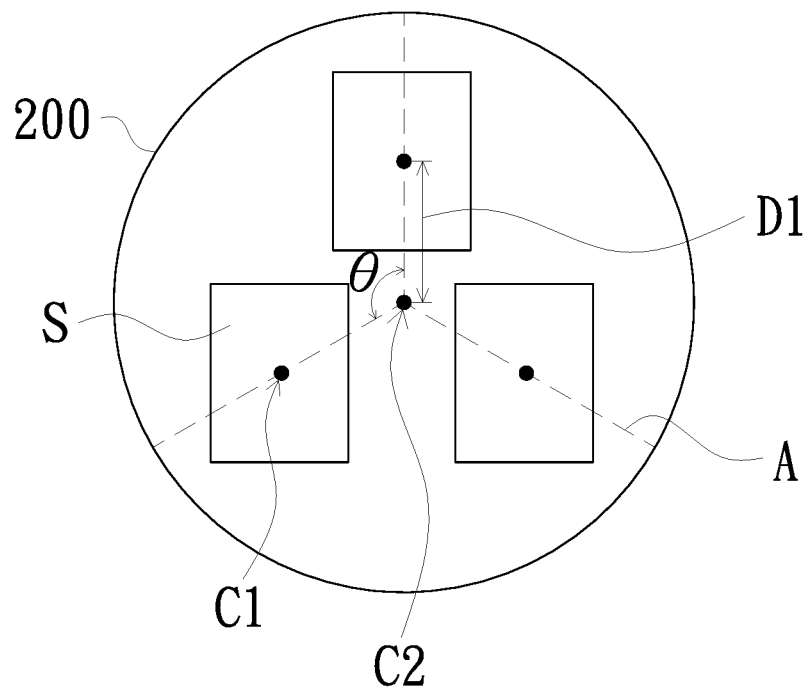
FIG. 2A to FIG. 2D are schematic diagrams of spots formed by excitation light beams on a light condensing element in the illumination system of four embodiments of the invention.
Figure 2B:
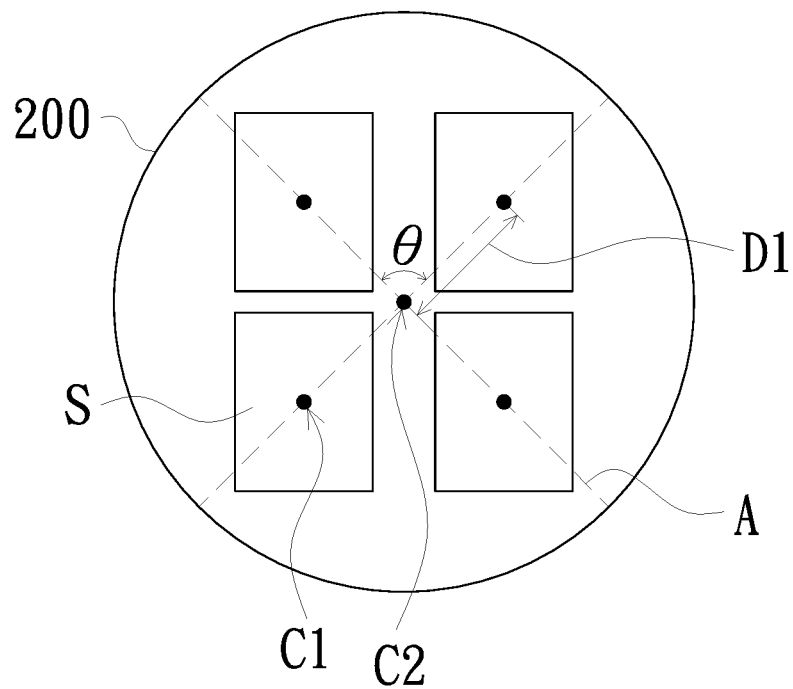
Figure 2C:
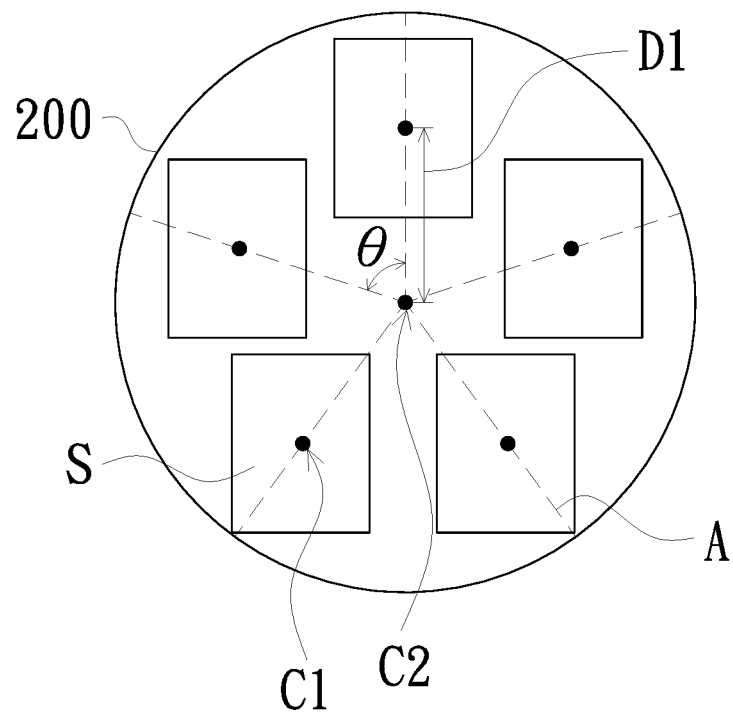
Figure 2D:
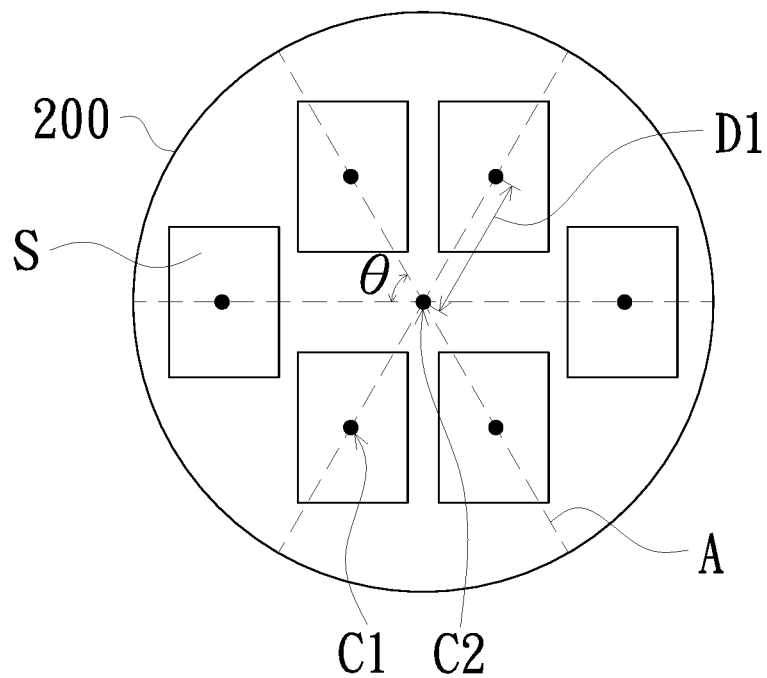

The above-mentioned angles θ between the straight lines A formed by connecting the centers C1 of the spots S with the center C2 of the light condensing element 200 respectively are, for example, the same, but not limited thereto. In other embodiments, the angles θ can be different. The distances D1 between each of the centers C1 of the spots S and the center C2 of the light condensing element 200 may be the same (as shown in FIG. 2A to FIG. 2C) or different (as shown in FIG. 2D). However, in each embodiment of FIG. 2A to FIG. 2C, the distances D1 may also be different, and similarly, in the embodiment of FIG. 2D, the distances D1 may also be the same. In short, the angles θ between the straight lines A formed by connecting the centers C1 of the spots S with the center C2 of the light condensing element 200 respectively can be any angle, and the distances D1 between each of the centers C1 of the spots S and the center C2 of the light condensing element 200 may be any length.

The distribution of the spots S in the above embodiments can cover the light condensing element 200 uniformly, so that the light condensing element 200 which condenses the illumination light beams provided by the light emitting element package structures 100 can have compacted size, and achieve a better space-saving configuration.

Figure 3:
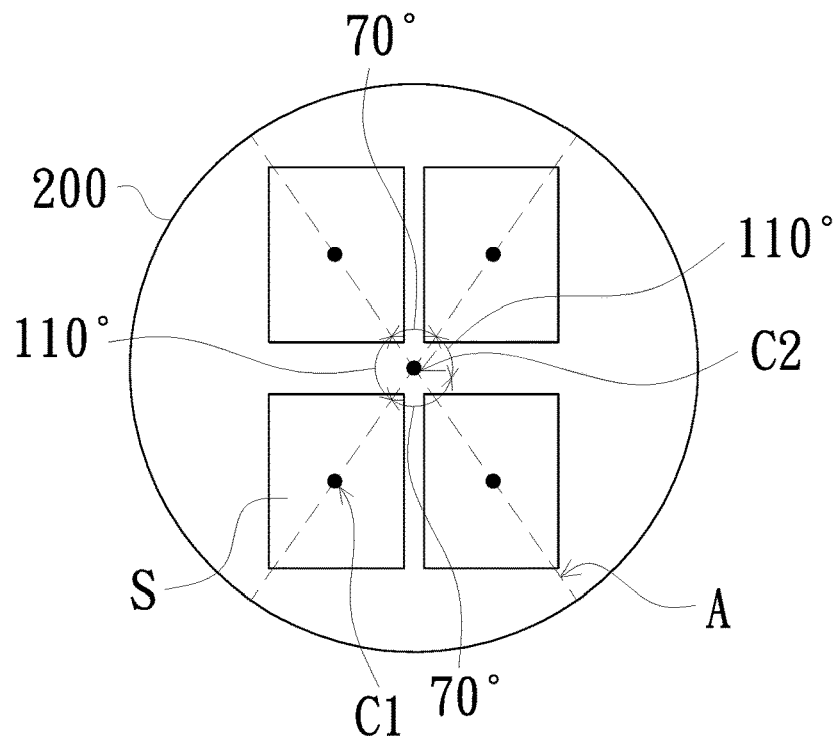
FIG. 3 is a schematic diagram of spots formed by the excitation light beams on the light condensing element in the illumination system of another embodiment of the invention.

FIG. 3 is a schematic diagram of spots formed by the excitation light beams on the light condensing element in the illumination system of another embodiment of the invention. Referring to FIG. 3, the number of the light emitting element package structures 100 of the embodiment is four, but is not limited thereto. The excitation light beam provided by each of the light emitting element package structures 100 forms a spot S on the light condensing element 200. The angles θ, between the straight lines A (shown by dotted lines in FIG. 3) formed by connecting the centers C1 of the spots S with the center C2 of the light condensing element 200 respectively, are 70°, 110°, 70°, and 110°, respectively. However, the embodiment is only one of the embodiments with different angles, and the arrangement of the light emitting element package structures 100 can be changed according to the quantity and design requirements, so as to achieve a better space-saving configuration.

Figure 4:
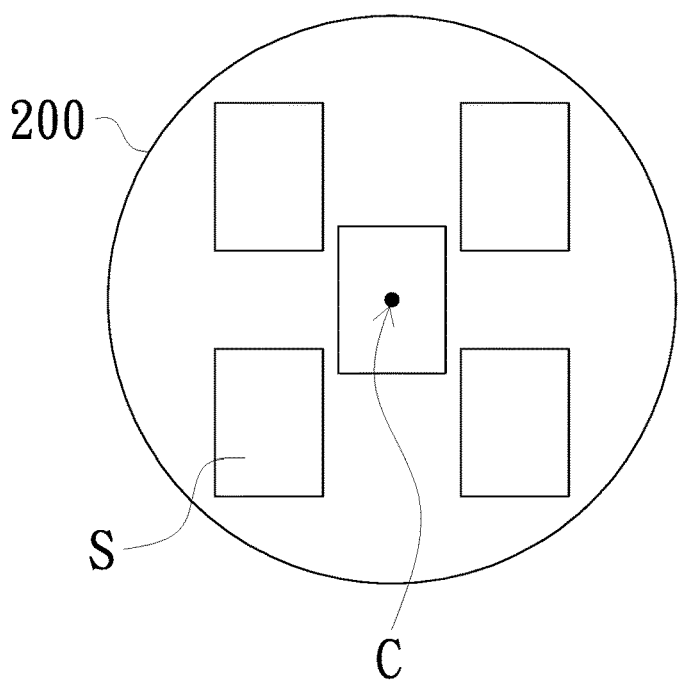
FIG. 4 is a schematic diagram of spots formed by the excitation light beams on the light condensing element in the illumination system of another embodiment of the invention.

FIG. 4 is a schematic diagram of spots formed by the excitation light beams on the light condensing element in the illumination system of another embodiment of the invention. Referring to FIG. 4, the number of the light emitting element package structures of the embodiment is exemplified by five, but not limited thereto. The excitation light beam provided by each of the light emitting element package structures forms a spot S on the light condensing element 200. One of the spots S corresponds to and covers the center C of the light condensing element 200. In the embodiment, except for the spot S covering the center C of the light condensing element 200, the remaining spots S are not particularly limited in arrangement, and a space-saving configuration can be achieved according to design requirements. Further, when the number of the light emitting element package structures is, for example, five, it can exhibit not only the arrangement shown in FIG. 4 but also the arrangement shown in FIG. 2C described above. Similarly, in the embodiments of FIGS. 2A, 2B, and 2D, a light emitting element package structure may be further added to form a spot S covering the center C of the light condensing element 200.

Figure 5:
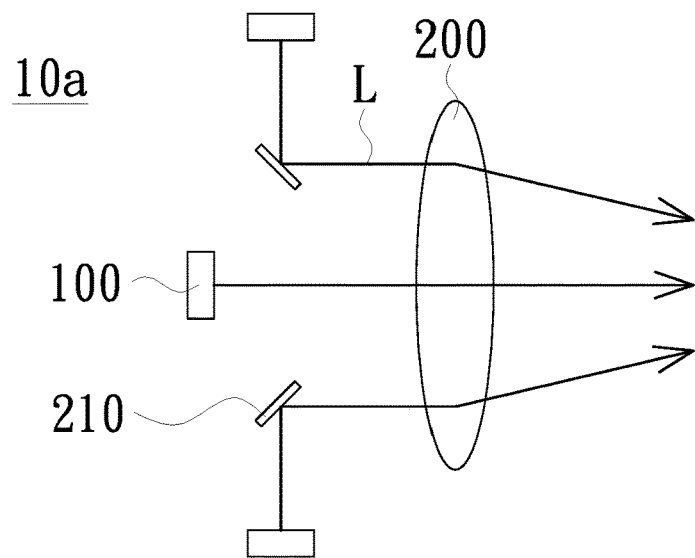
FIG. 5 is a schematic diagram of an illumination system of another embodiment of the invention.

FIG. 5 is a schematic diagram of an illumination system of another embodiment of the invention. Referring to FIG. 5, the illumination system 10a of the embodiment is similar in structure and advantages to the illumination system 10 of FIG. 1A, except that the illumination system 10a of the embodiment further includes, for example, at least one reflective element 210. The number of the reflective elements 210 is exemplified by two in FIG. 5, but not limited thereto. The reflective elements 210 are disposed between at least a portion of the light emitting element package structures 100 and the light condensing element 200. That is, the number of the reflective elements 210 may be the same as the number of the light emitting element package structures 100 or less than the number of the light emitting element package structures 100. Each of the reflective elements 210 is adapted to reflect the excitation light beam L provided by the corresponding light emitting element package structure 100 to the light condensing element 200.

The reflective element 210 described above is, for example, a reflective sheet, a reflective mirror or other element having a reflection function. When a plurality of light emitting element package structures 100 are disposed in the illumination system 10a, the transmission path of the excitation light beam L provided by the corresponding light emitting element package structure 100 can be deflected by the reflective element 210. In this way, the position and the light emergent direction of the light emitting element package structure 100 can be adjusted according to design requirements.

Figure 6:
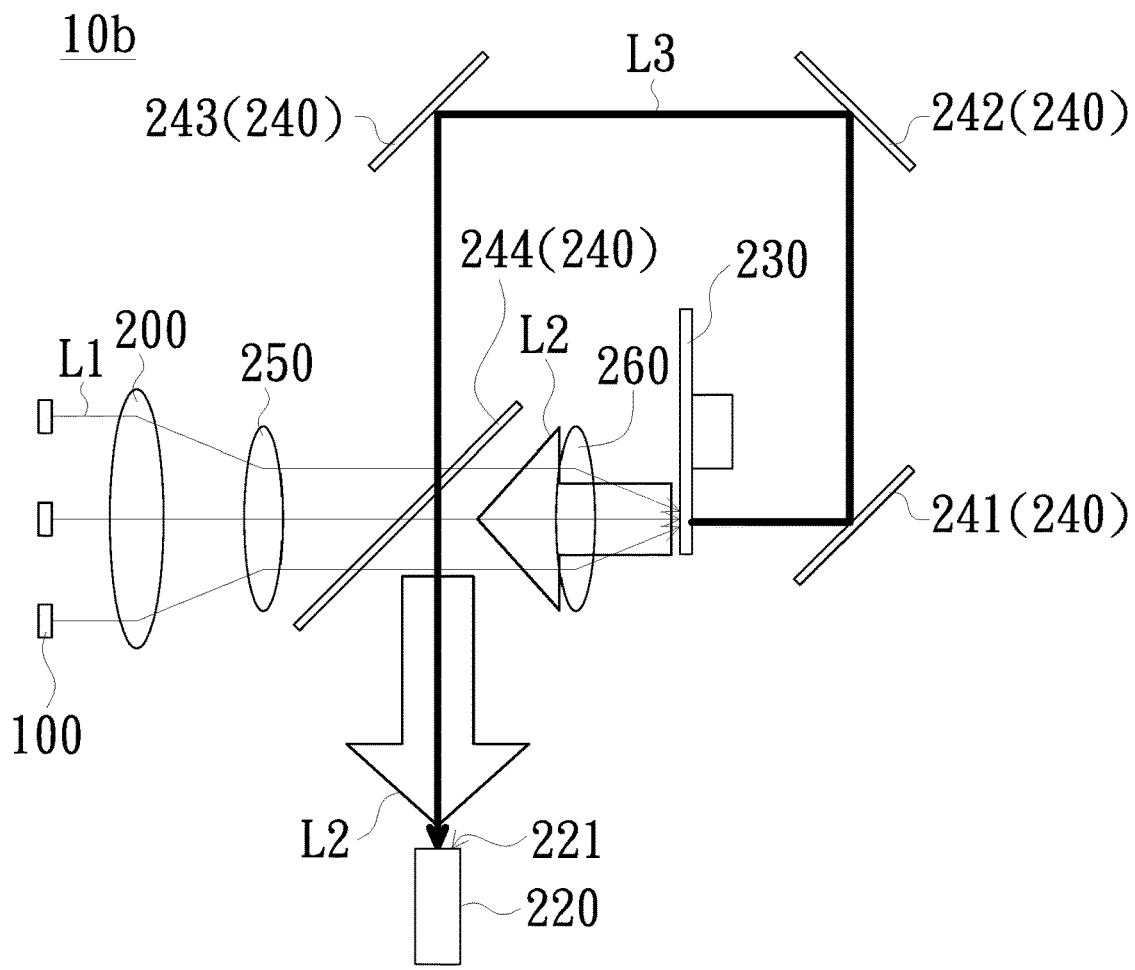
FIG. 6 is a schematic diagram of an illumination system of another embodiment of the invention.

In addition to including the light emitting element package structures 100 and the light condensing element 200, the illumination system 10, 10a described above may further include other elements depending on the product to which the illumination system 10, 10a is applied. FIG. 6 is a schematic diagram of an illumination system of another embodiment of the invention. Referring to FIG. 6, the illumination system 10b of the embodiment is similar in structure and advantages to the illumination system 10 described above, and the main differences of the structure are explained below. The illumination system 10b of the embodiment can be applied to a projection device, and the illumination system 10b, for example, further includes a light integration rod 220, a wavelength conversion element 230, and a light guiding component 240. The wavelength conversion element 230 is disposed between the light condensing element 200 and the light integration rod 220, and is used to convert part of the excitation light beams L1 (i.e., a first portion of the excitation light beams L1) into a conversion light beam L2. The light integration rod 220 is disposed on transmission paths of an excitation light beam L3 (i.e., a second portion of the excitation light beams L1) from the wavelength conversion element 230 and the conversion light beam L2. The excitation light beams L1 are emitted from the light emitting element package structures 100, pass through the light condensing element 200, and are transmitted to the wavelength conversion element 230. A part of the excitation light beams L1 are converted into a conversion light beam L2 by the wavelength conversion element 230. The conversion beam L2 is then transmitted from the wavelength conversion element 230 to the light integration rod 220. The light guiding component 240 is disposed on transmission paths of the excitation light beam L3 (i.e., the second portion of the excitation light beams L1) from the wavelength conversion element 230 and the conversion light beam L2 (converted from the first portion of the excitation light beams L1), and is used to guide the excitation light beam L3 and the conversion beam L2 to the light integration rod 220.

In the embodiment, the wavelength conversion element 230 is, for example, a phosphor wheel. In an embodiment, the light guiding component 240 of the illumination system 10b includes, for example, three reflective elements 241, 242, 243 and a dichroic element 244, but is not limited thereto. The reflective elements 241, 242, 243 are used to sequentially reflect the excitation light beam L3 to guide the excitation light beam L3 to the dichroic element 244. The dichroic element 244 is, for example, a dichroic mirror or a dichroic coating plated in a prism, but is not limited thereto. The dichroic element 244 is used to pass the excitation light beams L1 and L3 and reflect the conversion light beam L2. The excitation light beam L3 passing through the dichroic element 244 and the conversion light beam L2 reflected by the dichroic element 244 are both transmitted to the light integration rod 220.

Although the embodiment is exemplified by a phosphor wheel that allows a part of the excitation light beams L1 (i.e., the excitation light beam L3) to pass through, the architecture of the illumination system of the invention is not limited thereto. In other embodiments not shown, the phosphor wheel can also reflect the part of the excitation light beams L1 (i.e., the excitation light beam L3), and then cooperate with other elements of the illumination system 10b to enable the reflected the excitation light beam L3 and the conversion light beam L2 to enter the light integration rod 220.

The illumination system 10b may further include a plurality of lenses or other optical elements, such as a first light condensing lens 250 and a second light condensing lens 260. The first light condensing lens 250 is disposed between the light condensing element 200 and the dichroic element 244. The second light condensing lens 260 is disposed between the dichroic element 244 and the wavelength conversion element 230. In the embodiment of FIG. 6, the excitation light beams L1 sequentially pass through the light condensing element 200, the first light condensing lens 250, the dichroic element 244, and the second light condensing lens 260, and then converge on the wavelength conversion element 230.

Figure 7:
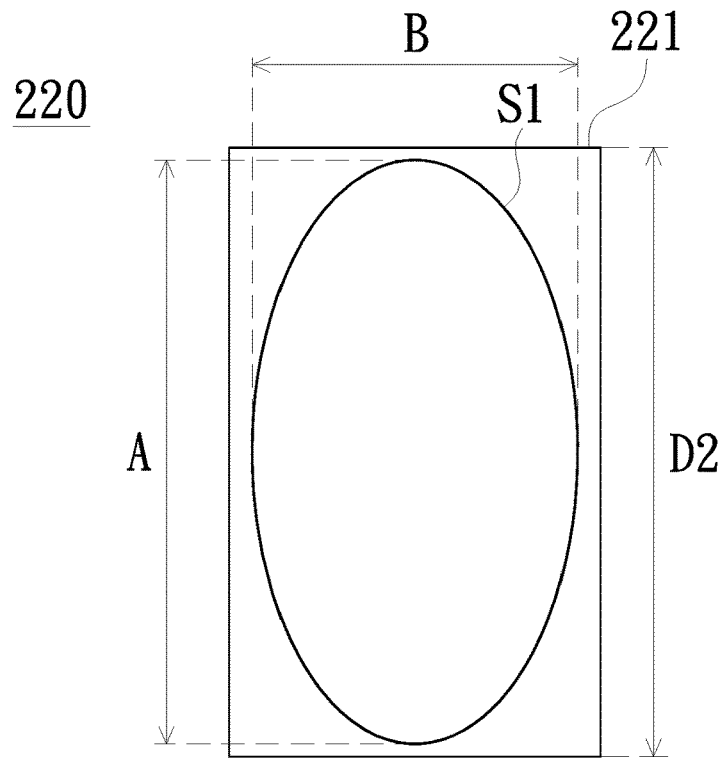
FIG. 7 is a schematic diagram of a spot of a sub-excitation light beam on a light incident end of a light integration rod of one embodiment of the invention.
Figure 8:
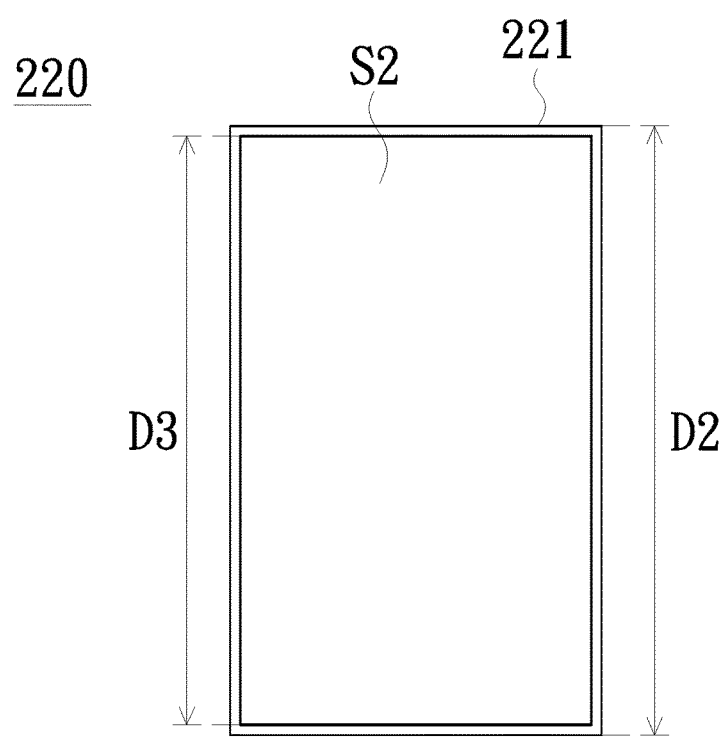
FIG. 8 is a schematic diagram of a spot of excitation light beams on a light incident end of a light integration rod of one embodiment of the invention.

FIG. 7 is a schematic diagram of a spot of a sub-excitation light beam on a light incident end of a light integration rod of one embodiment of the invention. FIG. 8 is a schematic diagram of a spot of excitation light beams on a light incident end of a light integration rod of one embodiment of the invention. Referring to FIG. 1B, FIG. 6, FIG. 7, and FIG. 8, the light integration rod 220 of the embodiment has a rectangular light incident end 221, and each of the light emitting chips 120 is adapted to provide a sub-excitation light beam (not shown). The spot S1 formed by each sub-excitation light beam at the light incident end 221 has an elliptical shape approximate to the shape/contour of the light incident end 221, that is, an elliptical shape similar to a rectangle. To simplify the drawing, only one spot S1 is illustrated in FIG. 7. The elliptical spot S1 has a major axis A and a minor axis B perpendicular to each other, and the major axis A is parallel to the two long sides D2 of the light incident end 221. Thus, the spot S2 of the excitation light beam of the embodiment at the light incident end 221 can be, for example, rectangular. In the embodiment, the two long sides D3 of the spot S2 are, for example, parallel to the two long sides D2 of the light incident end 221, and the shape of the spot S2 corresponds to the shape of the light incident end 221. In this way, when the excitation light beam L3 and the conversion light beam L2 excited by the wavelength conversion element 230 are transmitted to the light integration rod 220, the spot matches the shape of the light incident end 221 of the light integration rod 220 to improve the light utilization efficiency.

Figure 9:
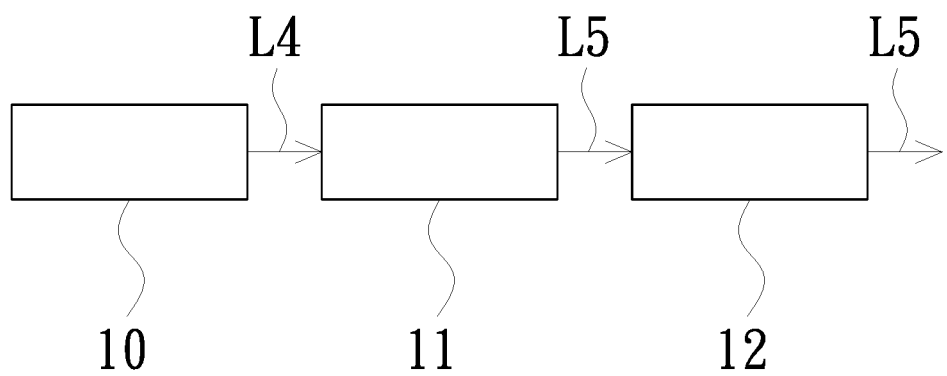
FIG. 9 is a block diagram of a projection device of one embodiment of the invention.

FIG. 9 is a block diagram of a projection device of one embodiment of the invention. Referring to FIG. 9, the projection device 1 of the embodiment includes the illumination system 10, a light valve 11, and a projection lens 12. The illumination system 10 is adapted to provide an illumination light beam L4. The light valve 11 is disposed on the transmission path of the illumination light beam L4 and is adapted to convert the illumination light beam L4 into an image light beam L5. The projection lens 12 is disposed on the transmission path of the image light beam L5 and is adapted to pass the image light beam L5 and project on the screen (not shown) to form an image frame on the screen. In an embodiment, the illumination system 10 can further include a color wheel (not shown) that is positioned on the transmission path of the illumination light beam L4 to filter the illumination light beam L4. The light valve 11 may be a transmissive light valve or a reflective light valve, for example a liquid crystal display panel (LCD panel), a digital micro-mirror device (DMD) or a liquid crystal on silicon panel (LCoS panel). The number of the light valves 11 may be one or more depending on the design. Since the size of the illumination system 10 is smaller, the projection device 1 has the advantage of compacted size. The projection device 1 can also use the illumination system of the other embodiments described above, such as the illumination system 10a or 10b.

In summary, the light emitting element package structure used in the illumination system of the embodiment of the invention can arrange the plurality of light emitting chips in the same light emitting element package structure, so that the arrangement between the light emitting chips can be closer. Compared with the prior art, in the case where the number of the light emitting chips is the same, the light emitting element package structure of the embodiment of the invention has compacted size, and the size of the light condensing element can be compacted due to the tight arrangement between the light emitting chips, so the size of the illumination system can be compacted, and the size and cost of the light condensing element can be reduced too. The projection device of the embodiment of the invention has the advantage of compacted size due to the use of the illumination system described above.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first light condensing lens and the second light condensing lens are only used for distinguishing various elements and do not limit the number of the elements.

What is claimed is:

1. An illumination system, adapted to provide an illumination light beam, the illumination system comprising:
   a plurality of light emitting element package structures; and
   a light condensing element, wherein the light emitting element package structures are adapted to provide a plurality of excitation light beams respectively, the light condensing element is disposed on transmission paths of the excitation light beams, and each of the light emitting element package structures comprises:
      a substrate;
      a plurality of light emitting chips, disposed on the substrate; and
      a package lens, disposed on the substrate and covering the light emitting chips, wherein each of the package lenses comprises a plurality of lens units, and the lens units in each of the package lenses are integrally connected to cover the light emitting chips,
   wherein the excitation light beam provided by each of the light emitting element package structures forms a spot on the light condensing element, centers of the spots are respectively connected to a center of the light condensing element into a plurality of straight lines, and angles between the straight lines are the same or different.

2. An illumination system, adapted to provide an illumination light beam, the illumination system comprising:
   a plurality of light emitting element package structures; and
   a light condensing element, wherein the light emitting element package structures are adapted to provide a plurality of excitation light beams respectively, the light condensing element is disposed on transmission paths of the excitation light beams, and each of the light emitting element package structures comprises:
      a substrate;
      a plurality of light emitting chips, disposed on the substrate; and
      a package lens, disposed on the substrate and covering the light emitting chips,
   wherein each of the package lenses comprises a plurality of lens units, and the lens units in each of the package lenses are integrally connected to cover the light emitting chips,
   wherein the excitation light beam provided by each of the light emitting element package structures forms a spot on the light condensing element, and distances between each center of the spots and a center of the light condensing element are the same or different.

3. The illumination system of claim 1, wherein the excitation light beam provided by each of the light emitting element package structures forms a spot on the light condensing element, and one of the spots corresponds to a center of the light condensing element.

4. The illumination system of claim 1, further comprising at least one reflective element, wherein the reflective element is disposed between at least a portion of the light emitting element package structures and the light condensing element, and the reflective element is adapted to reflect the excitation light beam provided by the corresponding light emitting element package structure to the light condensing element.

5. An illumination system, adapted to provide an illumination light beam, the illumination system comprising:
a plurality of light emitting element package structures; and
a light condensing element, wherein the light emitting element package structures are adapted to provide a plurality of excitation light beams respectively, the light condensing element is disposed on transmission paths of the excitation light beams, and each of the light emitting element package structures comprises:
a substrate;
a plurality of light emitting chips, disposed on the substrate; and
a package lens, disposed on the substrate and covering the light emitting chips, wherein each of the package lenses comprises a plurality of lens units, and the lens units in each of the package lenses are integrally connected to cover the light emitting chips,
wherein all the light emitting element package structures are relatively disposed to the light condensing element, and the excitation light beams are transmitted to the light condensing element without being deflected.

6. The illumination system of claim 1, further comprising a light integration rod, wherein the light integration rod is disposed on transmission paths of the excitation light beams transmitted from the light condensing element, the light integration rod has a rectangular light incident end, each of the light emitting chips is adapted to provide a sub-excitation light beam, a spot formed by the sub-excitation light beams at the light incident end is elliptical, the elliptical spot has a major axis and a minor axis perpendicular to each other, and the major axis is parallel to two long sides of the light incident end.

7. The illumination system of claim 6, further comprising:
a wavelength conversion element, disposed between the light condensing element and the light integration rod, and adapted to convert a first portion of the excitation light beams into a conversion light beam; and
a light guiding component, disposed on transmission paths of a second portion of the excitation light beams and the conversion light beam transmitted from the wavelength conversion element, and adapted to guide the second portion of the excitation light beams and the conversion light beam to the light integration rod.

8. The illumination system of claim 1, wherein the light emitting chips are laser diode chips.

9. The illumination system of claim 1, wherein the light emitting chips of each of the light emitting element package structures are arranged in an array on the substrate.

10. The illumination system of claim 1, wherein the number of the light emitting element package structures is N, and N is selected from 3, 4, 5, or 6, the excitation light beam provided by each of the light emitting element package structures forms a spot on the light condensing element, centers of the spots are respectively connected to a center of the light condensing element into a plurality of straight lines, and angles between the straight lines are all 360°/N.

11. An illumination system, adapted to provide an illumination light beam, the illumination system comprising:
a plurality of light emitting element package structures; and
a light condensing element, wherein the light emitting element package structures are adapted to provide a plurality of excitation light beams respectively, the light condensing element is disposed on transmission paths of the excitation light beams, and each of the light emitting element package structures comprises:
a substrate;
a plurality of light emitting chips, disposed on the substrate; and
a package lens, disposed on the substrate and covering the light emitting chips, wherein each of the package lenses comprises a plurality of lens units, and the lens units in each of the package lenses are integrally connected to cover the light emitting chips,
wherein the number of the light emitting element package structures is 4, the excitation light beam provided by each of the light emitting element package structures forms a spot on the light condensing element, centers of the spots are respectively connected to a center of the light condensing element into a plurality of straight lines, and angles between the straight lines are respectively 70°, 110°, 70°, and 110°.

* * * * *